United States Patent [19]

Nakabayashi

[11] Patent Number: 5,150,264

[45] Date of Patent: * Sep. 22, 1992

[54] SAFETY DEVICE FOR CONTROLLABLY DRIVING THE CASSETTE HOLDER OF A VIDEO CASSETTE RECORDER SUBJECTABLE TO OVERLOAD

[75] Inventor: Toshiya Nakabayashi, Tokyo, Japan

[73] Assignee: Sony Corporation, Tokyo, Japan

[*] Notice: The portion of the term of this patent subsequent to Mar. 17, 2009 has been disclaimed.

[21] Appl. No.: 613,135

[22] Filed: Nov. 14, 1990

[30] Foreign Application Priority Data

Aug. 30, 1988 [JP] Japan ................................ 63-215501
Aug. 30, 1988 [JP] Japan ................................ 63-215502

[51] Int. Cl.⁵ ...................... G11B 15/00; G11B 15/18; G11B 15/60
[52] U.S. Cl. ........................................ 360/71; 360/69; 360/137
[58] Field of Search ....................... 360/71, 74.1, 96.5, 360/99.06, 137

[56] References Cited

U.S. PATENT DOCUMENTS

| 3,994,015 | 11/1976 | Tomioka et al. | 360/85 |
|---|---|---|---|
| 4,413,291 | 11/1983 | Ueki et al. | 360/71 |
| 4,494,181 | 1/1985 | Ramlohr et al. | 363/63 |
| 4,644,234 | 2/1987 | Nola | 313/254 |
| 4,663,573 | 5/1987 | Maetani et al. | 318/6 |
| 4,677,356 | 6/1987 | Tsuneda et al. | 318/258 |
| 4,733,314 | 3/1988 | Ogawa et al. | 360/71 |
| 4,933,790 | 6/1990 | Mitumaru | 360/96.5 |
| 4,999,721 | 3/1991 | Ogawa | 360/71 |
| 5,097,378 | 3/1992 | Nakabayashi | 360/69 |

FOREIGN PATENT DOCUMENTS

| 0131489 | 1/1985 | European Pat. Off. . |
| 0192448 | 8/1986 | European Pat. Off. . |
| 2484168 | 12/1981 | France . |
| 55-136884 | 10/1980 | Japan . |
| 55-136892 | 10/1980 | Japan . |
| 58-88859 | 5/1983 | Japan . |
| 59-152556 | 8/1984 | Japan . |
| 61-032261 | 2/1986 | Japan . |

Primary Examiner—John H. Wolff
Assistant Examiner—Craig A. Renner
Attorney, Agent, or Firm—Alvin Sinderbrand; William S. Frommer

[57] ABSTRACT

Motor control apparatus comprised of a drive circuit for supplying drive current to a motor, an overload detector coupled to the motor for detecting the magnitude of the motor current to produce an output signal if that current exceeds a predetermined threshold level caused by motor overload, and a control circuit coupled to the drive circuit and responsive to the output signal for controlling the drive current supplied to the motor, thereby controlling motor operation.

6 Claims, 6 Drawing Sheets

SAFETY DEVICE FOR CONTROLLABLY DRIVING THE CASSETTE HOLDER OF A VIDEO CASSETTE RECORDER SUBJECTABLE TO OVERLOAD

This application is a division of application Ser. No. 07/398,967, filed Aug. 28, 1989.

BACKGROUND OF THE INVENTION

1. Field of the Invention

This invention relates to motor control apparatus and, more particularly, to a circuit which is adapted to sense a motor overload condition whereupon motor operation is controlled to alleviate that condition, such as by reversing the motor, reducing the drive current supplied to the motor or interrupting the drive current so as to stop the motor.

2. Description of the Prior Art

Motor control circuitry has long been used in driving, regulating and controlling the operation of an electric motor. Often, such motor control circuitry is intended to provide protection against motor damage and, for those applications in which the motor is used with user-operated devices, to prevent personal injury to the user.

One example of a controllable motor adapted for use in a human environment is found in recording/reproducing apparatus, such as a video tape recorder (VTR). Many commercially available VTR's employ a cassette holder to receive a tape cassette which then is loaded into the VTR. Typically, an electric motor is mechanically coupled to the cassette holder and is driven to move that cassette holder between a load/unload position whereat the tape cassette may be loaded onto or unloaded from the holder, and a record/playback position whereat the tape cassette is brought into operable relationship with electromechanical record/reproducing apparatus. Usually, the simple actuation of a START switch energizes the motor to drive the cassette holder, either from its load/unload position to its record/playback position or from its record/playback position to its load/unload position. It is recognized, however, that uncontrolled motor operation may lead to personal injury of the user. For example, the user may accidentally locate his finger in the path of the cassette holder as it moves from its load/unload position to its record/playback position, resulting in possibly severe damage or painful injury.

To minimize this risk of personal injury, various safeguards have been proposed to prevent the user from inadvertently placing his finger in the path of motor-driven apparatus. Unfortunately, even the most detailed precautions often are defeated or, at the least, result in complicated and often difficult manipulation by the user in loading or unloading a tape cassette from its holder. Accordingly, as an alternative, protection arrangements have been proposed which stop a cassette loading operation should the user's finger become entangled in the equipment. While this may prevent further injury, such arresting apparatus often relies upon mechanical elements which, while stopping the movement of the drive motor nevertheless does nothing about the continued supply of drive current thereto. As a result, the motor may be subjected to a current overload condition in which excess motor current flows therethrough. Consequently, the motor may be damaged and may burn out.

Another difficulty associated with mechanical protection devices is attributed to the fact that such devices often are quite large and bulky and are not easily incorporated into portable VTR's, such as video cameras. In particular, 8mm video cameras which record on and play back from an 8mm cassette are quite small and cannot easily accommodate the aforementioned protection devices.

In recognition of the danger of motor overload, some relatively simple techniques have been proposed to prevent the motor from burning out due to excess motor current drawn thereby. For example, the motor may be designed to exhibit limited torque which also limits the current; or the motor drive circuit may impose an inherent limitation on the maximum current that may be supplied thereby. Such proposals limit the power that can be exerted by the motor and often require a motor and motor drive circuit that are relatively expensive to design and manufacture.

One simple alternative to special motor design is the use of a fuse connected in series between the power supply from which the motor is driven and the motor drive circuit, or even the motor itself. While a fuse may prevent the motor from drawing excess current and, thus, avoid burn-out, a "blown" fuse must be replaced, and this may result in frequent servicing of the motor-driven equipment. In the environment of consumer equipment, it may be difficult for a user to carry out even the relatively simple task of replacing a fuse, thus making it more difficult for the user himself to maintain and service his equipment.

An alternative to the use of a simple fuse relies upon a variable power supply which is controlled to reduce the current supplied thereby to the motor when an overload condition is sensed. For example, when overload is sensed, the power supply voltage may be reduced to prevent motor burn-out. However, if a common power supply is used to provide energy both for the motor and for other circuits used with the motor-driven equipment, a change in the power supply voltage which is intended to prevent motor burn-out may induce malfunctions or faults in other circuitry that is supplied with that same power supply voltage. To avoid this possibility, a separate power supply is needed for the exclusive use of the motor and motor drive circuitry. This, however, is expensive, adds to the complexity of the overall equipment, and increases the size and weight of the motor-driven apparatus.

One proposed protection circuit which is intended to prevent motor burn-out yet does not require a separate power supply and does not vary the power supply voltage that is used by other circuitry connects a current limiting circuit in series between the motor drive circuit and the power source from which motor current is derived. The current limiting circuit includes active devices, such as FET's, bipolar transistors, or the like, and functions to limit the current flowing from the power supply to the motor. The current limiting circuit is sensitive to current flowing therethrough to the motor such that when this motor current increases in magnitude, the impedance of the current limiting circuit likewise increases. Hence, the current permitted to flow through this circuit to the motor is limited so as not to exceed some predetermined level.

Unfortunately, the use of a current limiting circuit of the aforementioned type increases the power dissipation of the overall circuitry due to the fact that the impedance connected in series with the power supply increases. Furthermore, the use of transistors and other active elements in the current limiting circuit inherently dissipates power even when such devices are quiescent, as when the motor current is well below the aforementioned predetermined level. Consequently, if the motor and motor protection circuitry are used in portable equipment, the battery pack power source normally used with that equipment will exhibit a shorter effective life because of the increased power dissipation in the current limiting circuit. Moreover, such current limiting circuitry is rather bulky and, thus, is unsuitable for portable, compact equipment such as portable video cameras.

OBJECTS AND SUMMARY OF THE INVENTION

Therefore, it is an object of the present invention to provide protection circuitry for use with motor-driven apparatus to prevent injury to a user, damage to the motor and damage to the equipment with which that motor is used.

Another object of this invention is to provide motor control apparatus for controlling the operation of a motor in the event of an overload condition, yet avoids the aforenoted disadvantages, drawbacks and defects of prior art proposals.

A still further object of this invention is to provide motor control apparatus which functions to limit the current supplied to a motor so as to prevent motor overload, yet is compact, does not dissipate significant amounts of power and is well-suited for use in portable motor-driven equipment, such as a video recorder.

An additional object of this invention is to provide motor-driven tape cassette loading apparatus in which a motor controller detects motor load conditions so as to control that motor, such as by stopping or reversing it.

Various other objects, advantages and features of the present invention will become readily apparent from the ensuing detailed description, and the novel features will be particularly pointed out in the appended claims.

In accordance with this invention, motor control apparatus is comprised of a drive circuit for supplying drive current to a motor, an overload detector for detecting the magnitude of motor current so as to produce an output signal if that current exceeds a predetermined threshold level, as may be caused by motor overload, and a control circuit responsive to the aforementioned output signal for controlling the drive current supplied by the drive circuit to the motor.

As one aspect of this invention, the overload detector includes an enable circuit selectively operable during certain modes when motor overload is to be detected.

As a feature of this invention, the drive circuit includes a power source, variable impedance switches selectively energized for coupling the motor to that power source, and a bias circuit for varying the impedance of those switches to limit the current supplied through such switches to the motor. As an aspect of this feature, the aforementioned output signal produced by the overload detector is coupled to the bias circuit for varying the impedance of the variable impedance switches.

As another aspect of this feature, the variable impedance switches are connected as plural transistors (e.g. FET's or bipolar transistors) in H-configuration to couple the motor to the power source. The transistors are selectively energized to supply current to the motor in forward or reverse directions. The transistors may be further operated to brake the motor or to interrupt motor current such that the motor slows and stops.

In accordance with another feature of this invention, the control circuit includes a timer for sensing the presence of the aforementioned output signal for a predetermined time duration before controlling the motor drive current.

As yet a further feature of this invention, the overload detector includes a current level generator for generating a current level signal representative of the motor current, a reference generator for providing a reference signal representative of a reference motor current, and a comparator for comparing the current level signal to the reference signal to produce the aforementioned output signal if the current level signal exceeds the reference signal. Preferably, the current level generator comprises a resistor connected in series with the motor to produce a voltage thereacross in response to the motor current.

In one advantageous application of the present invention, the controlled motor is used in a tape cassette loader by which a tape cassette is loaded and unloaded in a record/playback device, such as a VTR, video camera, or the like.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF PREFERRED EMBODIMENTS

Figure 5:
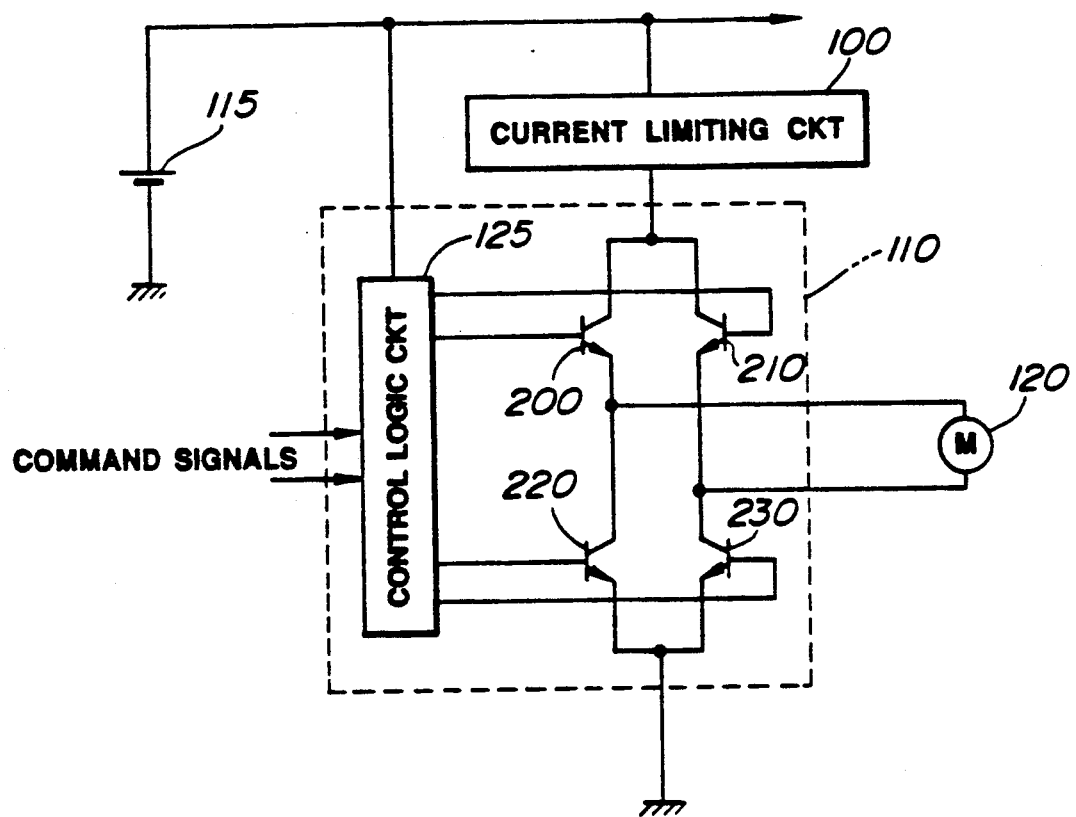
FIG. 5 is a partial block, partial schematic diagram of a prior art technique for limiting the current supplied to a motor so as to prevent motor overload.

Before discussing the present invention in detail, reference first is made to FIG. 5 which illustrates a prior art technique for preventing motor overload by limiting the current supplied to a motor. In this prior art circuit, motor current is supplied from a power supply 115 to a motor 120 by a motor drive circuit 110. A current limiting circuit 100 is interposed in the series circuit comprised of the power supply, the motor drive circuit and the motor. As shown, motor drive circuit 110 is formed as a so-called H-bridge of transistor pairs with motor 120 connected between transistors 200 and 230 of one pair and also between transistors 210 and 220 of another pair. A control logic circuit 125 responds to command signals from a controller (not shown) to selectively energize pairs of transistors. For example, when control logic circuit 125 energizes transistor pair 200, 230, current flows from power supply 115 through current limiting circuit 100, through transistor 200, through motor 120 and through transistor 230 to ground. As a result, motor 120 is driven in a first direction, such as the forward direction.

If the command signals command reverse motor drive, control logic circuit 125 energizes transistor pair 210, 220, whereupon current flows from power supply 115, through current limiting circuit 100, through transistor 210, through motor 120 and through transistor 220 to ground. It is seen that current now flows through motor 120 in the opposite direction, thus reversing the direction of motor movement. The command signals may command a dynamic braking operation, whereupon either transistors 200 and 210 are turned on or transistors 220 and 230 are turned on. Whichever pair of transistors is energized, the terminals of motor 120 are supplied with the same voltage, thus providing a short-circuit to dynamically brake the motor.

Finally, the command signals may command a stop operation, whereby motor 120 coasts to a stop. In response to this command, control logic circuit 125 de-energizes all of the transistors, thus interrupting current flow to motor 120.

Current limiting circuit 100 includes active devices, namely, transistors, field effect transistors (FET's) and the like. As current flows through these active devices, the impedance exhibited thereby increases. This has a self-limiting effect on the current supplied from power supply 115 to motor 120 because as the current level tends to increase, as by reason of a motor overload condition, the impedance of the current limiting circuit likewise increases which, in turn, opposes the increase in current levels. For example, if the movement of the motor is constrained, as by reason of an obstruction in the path of movement of a device driven by that motor, the current supplied to motor 120 tends to increase. But for current limiting circuit 100, this increase in current could reach an overload condition, whereupon the motor may burn out. But, by reason of the self-limiting effect of the current limiting circuit, such high current levels are avoided.

Unfortunately, current limiting circuit 100 is a source of power dissipation even when acceptable current levels are drawn by motor 120. If power supply 115 is comprised of a battery, such as if the apparatus with which the illustrated circuitry is used is portable equipment, such power dissipation drastically reduces the effective life of that battery. Furthermore, current limiting circuit 100 normally is rather bulky and may not be suitable for compact, portable equipment, such as portable video cameras having a VTR driven by motor 120.

Figure 1:
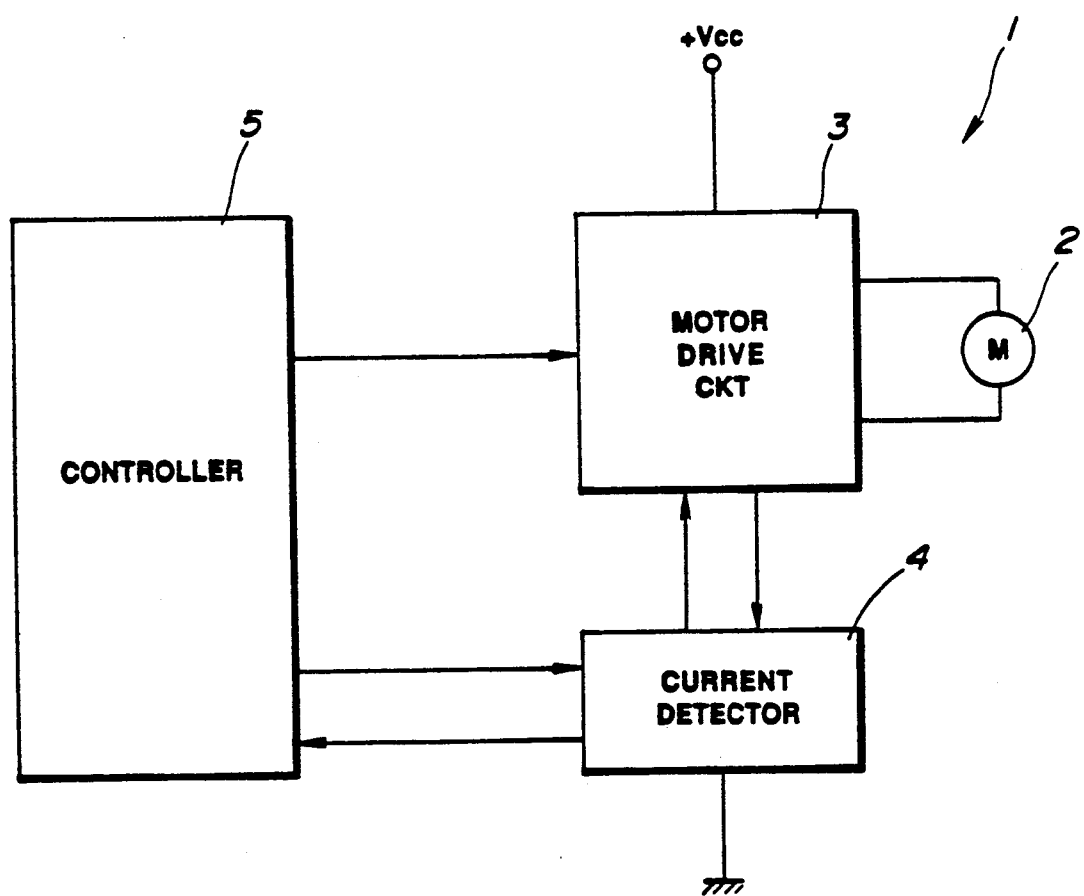
FIG. 1 is a block diagram of motor control circuitry which incorporates the present invention.

The disadvantages associated with the prior art circuitry shown in FIG. 5 are avoided by the present invention which is illustrated by the block diagram of FIG. 1. In the following description, like reference numerals are used in different drawing figures to identify the same components.

The motor control circuitry 1 shown in FIG. 1 is comprised of a motor drive circuit 3 which drives motor 2 with drive current, the magnitude of this current being sensed by a current detector 4. The overall operation of the motor drive circuit and current detector is controlled by a controller 5. As will be described in greater detail below, motor drive circuit 3 includes drive transistors, FET's, or the like which are selectively energized to supply current to motor 2 connected thereto. The conductivity or impedance of these drive elements is controlled by a bias circuit, thereby determining the magnitude of the current which flows through motor 2. In one embodiment, these drive elements are connected in pairs to the motor in an H-configuration; and respective pairs of these drive elements are selectively energized to determine the direction of current flowing through the motor. Controller 5 is coupled to motor drive circuit 3 and is adapted to select those transistor pairs to be energized and, thus, the controller determines the operating direction of the motor.

Current detector 4 is adapted to detect the magnitude of the current flowing through motor 2 and to compare this detected current level to a reference level representing a maximum, permissible motor current. It is appreciated that the motor may be considered to be overloaded when its current exceeds this amount. Of course, excess currents may be drawn by motor 2 even when the motor is not overloaded, such as during a start-up operation, and current detector 4 is designed to be immune from such non-overloaded, high current conditions.

An overload output signal is supplied to motor drive circuit 3 from current detector 4 when motor 2 is overloaded. This output signal serves to increase the impedance of the motor drive elements and thereby reduce the current supplied to the motor. In one embodiment, the output signal from current detector 4 is supplied to a bias circuit included in the motor drive circuit; and the bias circuit functions to adjust the bias voltage supplied to the drive elements so as to increase their impedances.

The overload output signal produced by current detector 4 also is supplied to controller 5 which responds thereto to generate control signals for motor drive circuit 3, thereby providing further control over the motor current supplied to motor 2. Preferably, the controller determines which of the drive elements included in the motor drive circuit are to be energized, and this, in turn, defines the direction of current flowing through motor 2, whether the motor is to be braked, and whether the motor is to be stopped. For example, controller 5 may respond to the overload output signal produced by current detector 4 to command a dynamic braking operation of motor 2. Alternatively, the controller may command a stop operation, as by interrupting the current supplied to the motor. As a still further alternative, controller 5 may change the pair of drive elements which have been energized in the motor drive circuit, thereby supplying current in the reverse direction to reverse the operation of the motor. Depending upon the environment in which the motor is used, any of these alternatives may be adopted to relieve the motor overload. Of course, as yet another alternative, it may be sufficient merely for the overload output signal produced by current detector 4 to be used by motor drive circuit 3 to increase the impedance of the drive elements and, thus, reduce the magnitude of the current supplied to the motor.

Controller 5 also is adapted to supply an enable signal to current detector 4 to enable the current detector to sense a motor overload condition during certain operating modes of motor 2. For example, motor 2 may be operated under conditions for which a safety mode is preferred; and motor current should be detected and limited. When operating in the safety mode, controller 5 enables current detector 4 to sense the motor current. However, during other modes, such as during diagnostic testing, assembly, and the like, it may be desired to disable current detector 4—and controller 5 thus does not supply the aforementioned enable signal to the current detector. As a result, high motor currents will not be sensed and the current detector will not function to initiate a reduction in motor current, a reversal in motor current or an interruption of motor current.

Figure 2:
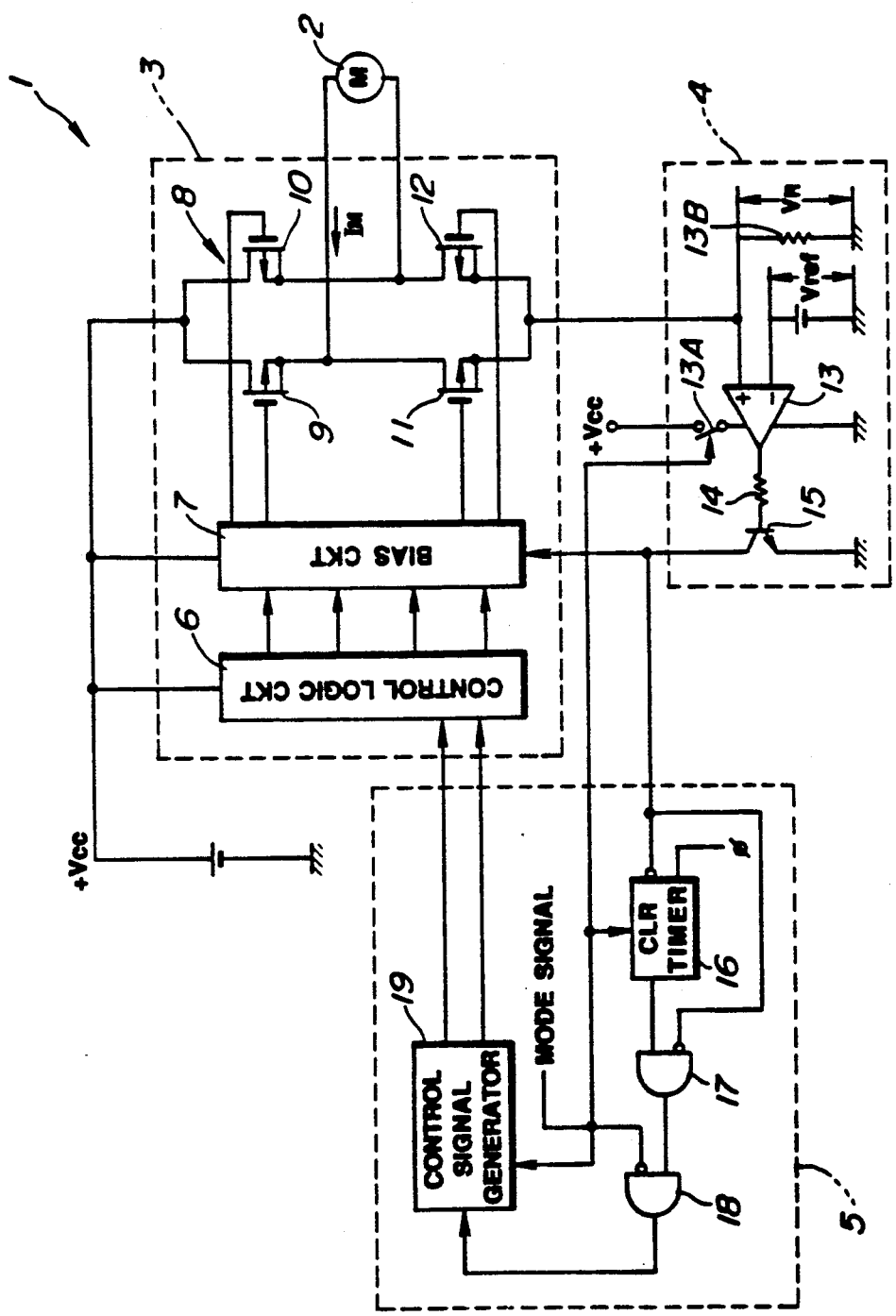
FIG. 2 is a partial block, partial schematic diagram of one embodiment of the present invention.

One embodiment of motor control apparatus to implement the block diagram shown in FIG. 1 is illustrated in FIG. 2. Although particular circuits and subcircuits are illustrated as being included in specific functional blocks, it will be appreciated that such designations merely are for convenience and are not intended to limit the present invention solely thereto. For example, control logic circuit 6 is illustrated as being included in motor drive circuit 3. It will be appreciated that it is equally appropriate to consider the control logic circuit as included in controller 5. In any event, for convenience, the circuits and subcircuits described below are assumed to be included in the circuit blocks shown in FIG. 2.

Motor drive circuit 3 is shown as being comprised of control logic circuit 6, a bias circuit 7 and a power control circuit 8 of variable impedance switches 9-12 which, in the present embodiment, are illustrated as an H-configuration of field effect transistors (FET's). The control logic circuit, bias circuit and power control circuit all are coupled to a voltage supply of operating potential $V_{cc}$ to be energized thereby. This source of operating potential also supplies the drive current $I_M$ for motor 2.

Control logic circuit 6 is adapted to receive control signals from controller 5 and functions to decode those control signals for selecting particular ones of switches 9-12 to be energized. It will be recognized that, although FET's are shown and described herein, other suitable drive elements may be used, such as bipolar transistors or other variable impedance switching elements.

Let it be assumed that the control signals supplied by controller 5 to control logic circuit 6 are 2-bit control signals. The following schedule summarizes the switch pairs that are energized and the resulting motor operation:

| Control Signal | Energized Switches | Motor Operation |
| --- | --- | --- |
| 01 | 9, 12 | Forward motion |
| 10 | 10, 11 | Reverse motion |
| 11 | 9, 10 (or 11, 12) | Braking |
| 00 | None | Stop |

Bias circuit 7 is coupled to control logic circuit 6 and supplies energizing (or drive) signals to those switches 9-12 which have been selected by controller 5. The bias circuit also is adapted to respond to an overload output signal produced by current detector 4 to vary the bias voltages applied thereby to switches 9-12 and thus vary the impedances or conductivity of such switches. As the bias circuit decreases the conductivity of the switches, the magnitude of the motor current supplied therethrough also decreases. Thus, by controlling bias circuit 7, the magnitude of the motor current may be controlled.

Assuming that switches 9-12 are FET's, these FET's are connected as follows: the gate of each FET is coupled to bias circuit 7 to receive an energizing signal produced by control logic circuit 6 and a bias voltage. The drain electrodes of FET's 9 and 10 are connected in common to voltage supply $+V_{cc}$, and the source electrodes of these transistors are connected to the drain electrodes of FET's 11 and 12. The source electrodes of FET's 11 and 12 are connected in common to current detector 4. Motor 2 is connected across the junction defined by FET's 9, 11 and 10, 12.

FET's 9-12 are energized in mutually exclusive pairs. It will be recognized that when FET's 9 and 12 are energized by the control signal decoded by control logic circuit 6, current flows from voltage supply $+V_{cc}$ to FET 9, through motor 2 and through FET 12 to current detector 4. Alternatively, when FET's 10 and 11 are energized, current flows from the voltage supply through FET 10, through motor 2 and through FET 11 to current detector 4. The motor current thus is reversed in polarity so as to reverse the operation of the motor. If FET's 9 and 10 are energized, a short circuit is connected across motor 2 to dynamically brake that motor. A similar dynamic braking effect is achieved if FET's 11 and 12 are energized. Of course, when none of the FET's is energized, no current flows from the voltage supply to the motor. As mentioned above, the magnitude of the current which flows through motor 2 is a function of the conductivity of the energized FET's which, in turn, is determined by bias circuit 7.

Current detector 4 is comprised of a comparator 13 which functions to compare a voltage derived from motor current $I_M$ to a reference voltage $V_{ref}$ which represents a maximum permitted motor current. In this regard, a resistor 13B is connected in series with power control circuit 8 such that the current which flows through the motor and the power control circuit also flows through resistor 13B to a reference potential, such as ground. The voltage $V_R$ developed across resistor 13B represents the level of the motor current and is coupled to one terminal, such as the non-inverting input, of comparator 13. Reference voltage $V_{ref}$ is coupled to the other terminal, shown as the inverting input, of the comparator. As one example, comparator 13 may be a differential amplifier, an operational amplifier, or the like. The output of comparator 13 is coupled by a resistor 14 to a transistor 15, shown, for example, as an npn transistor, whose collector electrode is connected to bias circuit 7. In the illustrated embodiment, when the voltage $V_R$ indicative of motor current $I_M$, exceeds the permitted current level represented by reference voltage $V_{ref}$, a positive output is produced by comparator 13 which renders transistor 15 conductive to supply a low signal level to bias circuit 7.

Comparator 13 is illustrated as having an energizing input coupled to voltage supply $V_{cc}$ by way of a switch 13A which, when closed, energizes the comparator and thus enables it to operate. Switch 13A may comprise any conventional switching device, such as a transistor switch, or the like, and is adapted to be closed by a mode signal supplied from controller 5. This mode signal may be thought of as an enable signal to enable current detector 4 to operate and is produced when the circuitry operates in the safety mode.

Controller 5 is adapted to supply a suitable control signal to control logic circuit 6 in response to a selected mode of operation for motor 2. A predetermined control signal is supplied in response to a detected overload condition. As shown, control signal generator 19 receives the mode signal which, for the safety mode, is a logic low signal that serves to close switch 13A and, thus, enable comparator 13. This safety mode signal also enables control signal generator 19 to generate the control signal which reverses or stops motor 2, as may be desired. Thus, when the mode signal level is low, motor overload is prevented.

Controller 5 also includes a timer 16 having an inverting enabling input coupled to transistor 15 and a timing input coupled to receive timing pulses generated by a suitable clock circuit (not shown). It is recognized that timer 16 is enabled by transistor 15 to count these timing pulses. When a predetermined pulse count is reached, that is, after a predetermined time duration following the enabling thereof, timer 16 produces an output signal. The timer also includes a clear input CLR which, when supplied with a logic high signal, as when the mode signal is high, inhibits timer 16 from responding to the output of transistor 15. The output of timer 16 is coupled to one input of an AND gate 17, the other input of which is an inverting input coupled to transistor 15. The output of AND gate 17 is coupled to one input of 18 whose other input is an inverting input connected to receive the mode signal. It is appreciated that AND gate 18 is enabled when the mode signal is low, as when motor 2 operates in the safety mode, but this AND gate is disabled when the mode signal is high. The output of AND gate 18 is coupled to control signal generator 19 and is adapted to trigger the control signal generator to generate the control signal by which motor 2 is reversed or, if desired, stopped.

The manner in which the motor control apparatus illustrated in FIG. 2 operates now will be described. Let it be assumed that the motor operates in its safety mode. Thus, the mode signal is a logic low signal. Although not shown herein, it will be recognized that any suitable external circuitry, such as a microprocessor or host machine, may be used to supply the mode signal. In any event, when the mode signal is low, switch 13A is closed and timer 16 and AND gate 18 are enabled.

Let it be further assumed that the control signals being generated by control signal generator 19 energize FET's 10 and 11, resulting in motor current $I_M$ flowing through motor 2 in the illustrated direction. This motor current also flows through resistor 13B of current detector 4 to produce a current level voltage $V_R$ representative of the magnitude of this motor current. If the current level voltage $V_R$ is less than the reference voltage $V_{ref}$, comparator 13 produces a low output signal to render transistor 15 nonconductive. It is desirable to select the reference voltage $V_{ref}$ as the maximum, safe motor current level. If, as an example, motor 2 is obstructed, the motor draws more current from voltage source $+V_{cc}$ and the motor current $I_M$ increases. If this motor current $I_M$ increases so as to overload the motor such that $V_R > V_{ref}$, comparator 13 produces a logic high signal output. Consequently, transistor 15 is rendered conductive to supply a logic low signal to bias circuit 7 and to timer 16. The bias circuit responds to this logic low signal to increase the impedance of switches 9-12, such as by reducing their conductivity. Consequently, the motor current $I_M$ decreases and this alleviates the overload condition.

If the motor current $I_M$ is reduced sufficiently, $V_R < V_{ref}$ and transistor 15 is turned off. However, if the reduction in motor current does not result in $V_R < V_{ref}$, transistor 15 remains conductive. Timer 16 is enabled when transistor 15 is turned on and timing pulses are counted. After the timer counts a predetermined number of such pulses, an output signal is supplied to AND gate 17. The AND gate had been enabled by the logic low signal produced by transistor 15; and if this logic low signal remains, the output of timer 16 passes through AND gate 17 and through previously enabled AND gate 18 to trigger control signal generator 19. The control signals now produced by the control signal generator may be such that all of switches 9-12 are deenergized and motor 2 coasts to a stop. Alternatively, these control signals may be such as to de-energize switches 10 and 11 and energize switches 9 and 12 so as to reverse the operation of the motor. It is expected that such reversal will remove the obstruction or other condition which resulted in motor overload.

If motor current $I_M$ is reduced below the detected overload condition prior to the time that timer 16 counts the predetermined number of pulses, transistor 15 will be rendered non-conductive to disable the timer and AND gate 17. Thus, a trigger signal will not pass from the timer through AND gates 17 and 18 to control signal generator 19. Hence, there will be no change in the current supplied to the motor, other than the reduction in motor current level by bias circuit 7, as discussed previously.

It is appreciated that timer 16 is adapted to prevent control signal generator 19 from being triggered erroneously when motor current $I_M$ undergoes relatively brief high level excursions. For example, the motor current will exhibit a high level for a relatively brief time duration when motor 2 first is turned on. It is preferred that the operation of the motor not be reversed or stopped immediately following this turn-on. Timer 16 prevents this. Timer 16 also avoids undesired changeover in motor operation that might otherwise occur in response to spurious current spikes that may be present in the motor current.

While timer 16 has been described as a pulse counter, it is appreciated that alternative timing devices may be provided, such as a conventional delay line or other timing circuit adapted to time out after a predetermined duration initiated by the output signal produced by comparator 13.

For non-safety operating modes of motor 2, the mode signal is a logic high signal to open switch 13A, thereby disabling comparator 13. This logic high mode signal also resets and maintains timer 16 in its reset condition. Hence, the timer does not supply a time-out signal to AND gate 17. Furthermore, the logic high mode signal disables AND gate 18, thereby preventing a spurious trigger signal from being applied to control signal generator 19. Control signal generator 19 merely responds to the logic high mode signal to supply control signals to control logic circuit 6 which, in turn, applies energizing signals to a selected pair of switches by way of bias circuit 7. Moreover, by disabling the operation of comparator 13, no output signal is produced thereby and transistor 15 remains non-conductive. Hence, bias circuit 7 does not increase the impedance (or reduce the conductivity) of switches 9-12. Consequently, in non-safety modes of operation, motor current need not be limited by the bias circuit under the control of current detector 4.

Figure 3:
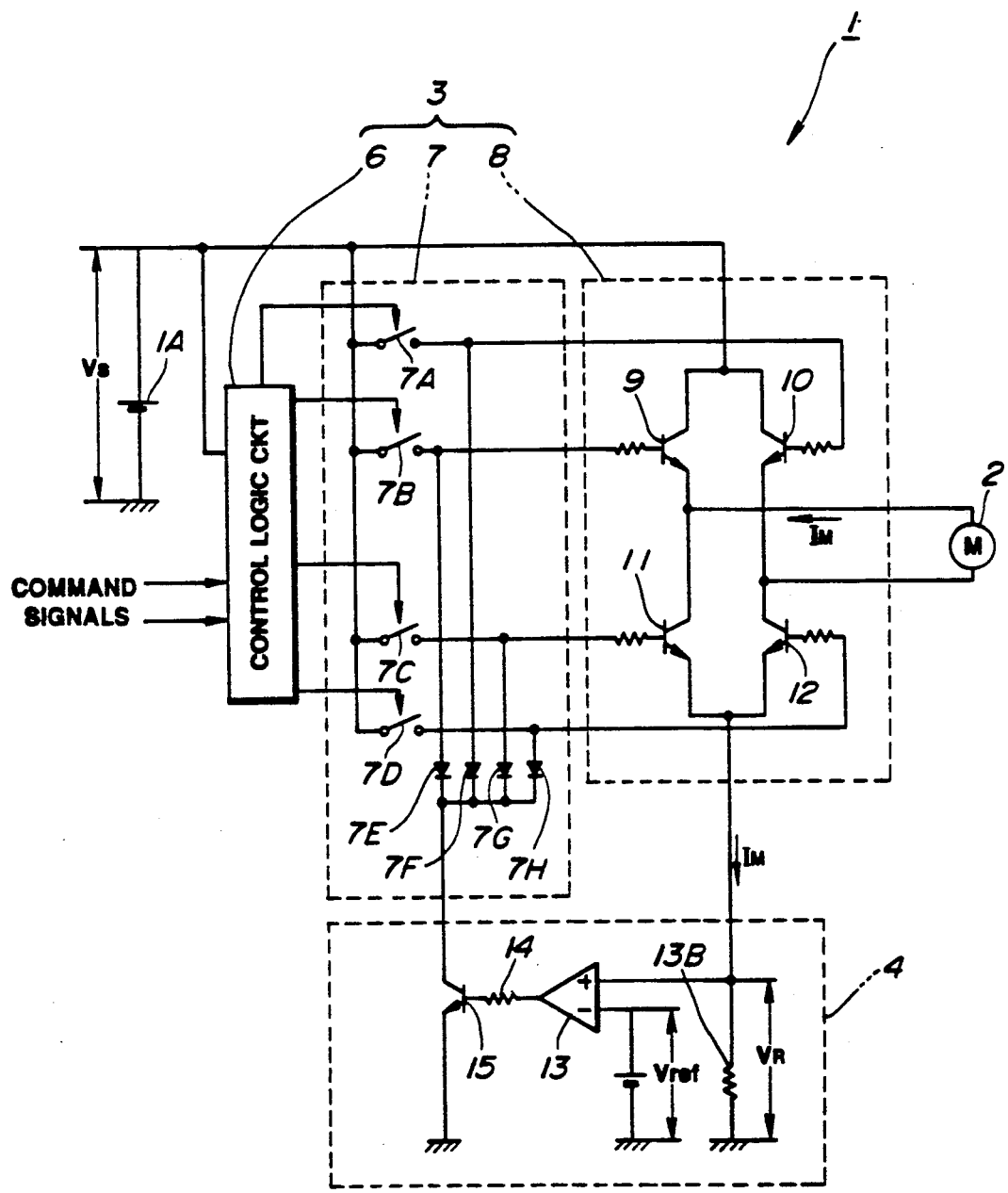
FIG. 3 is a partial block, partial schematic diagram of another embodiment of a portion of the present invention.

Another embodiment of current detector 4 and motor drive circuit 3 is illustrated in FIG. 3. Controller 5 is omitted from the illustrated embodiment; and current detector 4 and control logic circuit 6 are seen to be substantially the same in FIG. 3 as in FIG. 2.

The switches included in power control circuit 8 are comprised of bipolar transistors 9-12 in place of the FET's discussed above in conjunction with FIG. 2. Nevertheless, as was the case for the FIG. 2 embodiment, transistors 9-12 are energized in respective pairs to control the direction of current flow through motor 2. In addition, and as was discussed previously, motor 2 is dynamically braked if transistor pair 9, 10 is energized or if transistor pair 11, 12 is energized. Similarly, when all of the transistors are de-energized, motor current is interrupted and motor 2 coasts to a stop.

Bias circuit 7 is illustrated in greater detail and is comprised of switches 7A-7D connected to the base electrodes of transistors 9-12, respectively, and diodes 7E-7H having their anodes connected to the base electrodes of transistors 9-12, respectively, and their cathodes connected in common to the collector of transistor 15. Switches 7A-7D are illustrated as mechanical switches, but it will be recognized that each switch preferably is a conventional solid-state switching device. Control logic circuit 6 functions to decode the control (or command) signals supplied thereto by controller 5 (not shown); and the decoded signals serve to energize, or close, respective ones of switches 7A-7D. These switches are connected in common to a source of operating potential 1A which supplies a voltage $V_S$ through each closed switch to the base electrode of the transistor connected thereto. For example, to drive motor 2 in the forward direction, switches 7A and 7C are closed such that energizing potential is supplied from source 1A through switch 7A to the base electrode of transistor 10 and through switch 7C to the base electrode of transistor 11. Transistors 10 and 11 thus are energized to supply current from source 1A through transistor 10 to motor 2 and from motor 2 through transistor 11 to resistor 13B of current detector 4. If switches 7A and 7C are opened and switches 7B and 7D are closed, transistors 10 and 11 are deenergized while transistors 9 and 12 are turned on to supply current to motor 2 in the reverse direction. Control logic circuit 6 responds to the command signals supplied thereto to close those switches 7A-7D determined by the command signals and thereby direct the motor current $I_M$ flowing through motor 2.

In operation, if the motor current $I_M$ flowing through motor 2 and resistor 13B exceeds a predetermined level, thus indicative of an overload condition, the current level signal $V_R$ produced across resistor 13B exceeds the reference voltage $V_{ref}$, whereupon comparator 13 produces a logic high output signal. This signal renders transistor 15 conductive to supply a logic low signal to the common-connected cathodes of diodes 7E-7H. Consequently, these diodes are forward biassed to shunt a substantial portion of the energizing voltage from the base electrodes of those transistors which are conducting, and also to apply relatively low base voltages to the non-conducting transistors. As a result, the base bias voltages of the transistors in power control circuit 8 are reduced to reduce their conductivity and increase the impedance exhibited by each. Therefore, the magnitude of the current flowing through those transistors which are energized by control logic circuit 6, such as the current flowing through transistors 10 and 11, is reduced. This, in turn, reduces the motor current $I_M$ and alleviates the overload condition. Hence, possible damage to the motor and other apparatus is avoided.

Consistent with the foregoing example, let it be assumed that the impedance of resistors 10 and 11 are represented as $R_{10}$ and $R_{11}$, the resistance of motor 2 is represented as $R_M$ and the resistance of resistor 13B is represented as R. It is seen that such resistances $R_{10}$, $R_{11}$ and R are connected in series across voltage source 1A. When comparator 13 produces an output signal to render transistor 15 conductive, diodes 7F and 7G conduct to reduce the base voltages of transistors 10 and 11, thereby increasing the effective resistances $R_{10}$ and $R_{11}$. Hence, the maximum current $I_{max}$ that may flow from voltage source 1A through motor 2 may be expressed as follows:

$$I_{max} = \frac{V_s}{R_{10} + R_M + R_{11} + R}$$

Thus, bias circuit 7, and particularly diodes 7E-7H, increase the resistance presented by H-configuration transistors 9-10 to limit the current $I_M$ flowing through motor 2 when an overload condition is detected by comparator 13. The motor current thus is effectively controlled to prevent damage.

Figure 4A:
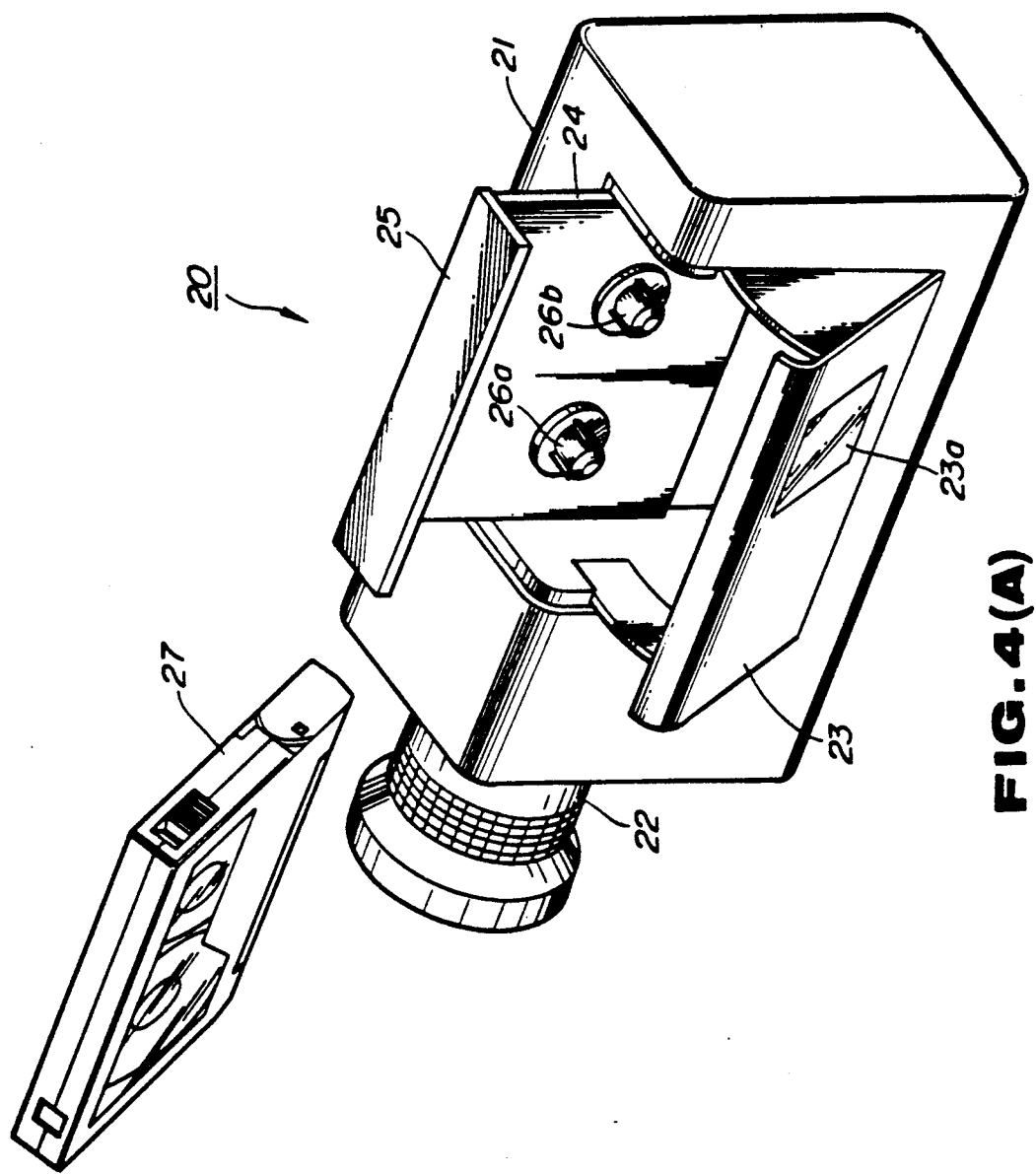
FIG. 4A is a perspective view of a portable video camera having a motor-driven cassette loader in which the present invention finds ready application.
Figure 4B:
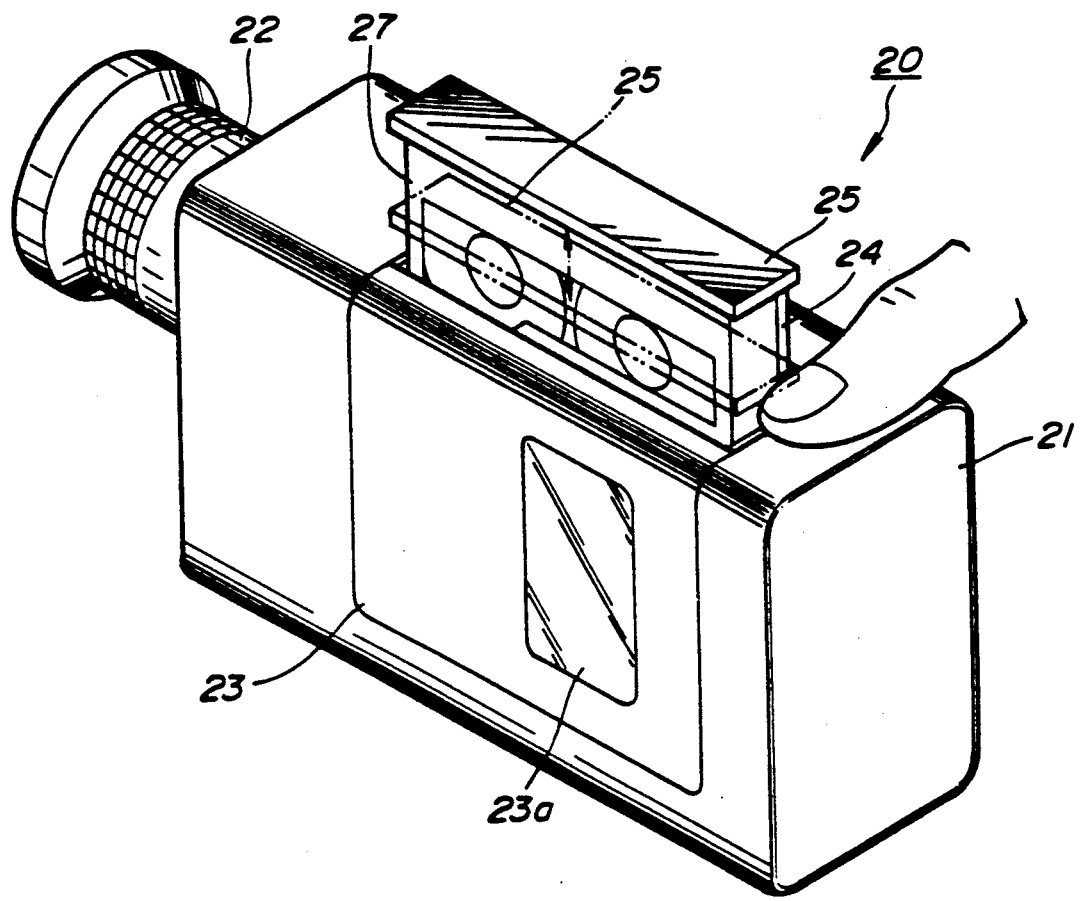
FIG. 4B is a perspective view of the video camera illustrating one possible cause of motor overload.

FIGS. 4A and 4B illustrate one embodiment of apparatus in which the motor control circuit of the present invention finds ready application. In particular, FIGS. 4A and 4B depict a video camera 20 which may be a portable video camera, such as an 8mm video camera, having a VTR incorporated therein. Video camera 20 includes a cassette holder 24 adapted to receive a video tape cassette 27 and movable between a pop-up load-/unload position, as shown in FIG. 4A, and a retracted position, shown in FIG. 4B, whereby the tape cassette 27 may be loaded onto cassette holder 24 and then located at a record/playback position to enable video signals to be recorded on and played back from the tape by the VTR (not shown).

Video camera 20 includes a housing 21, a camera lens 22 and a cassette compartment door 23 having a window 23a. Cassette holder 24 supports supply and take-up reels 26a and 26b and is formed with an end plate 25 to shield tape cassette 27 when the cassette is loaded into the cassette receiving compartment of the camera. The motor described above in conjunction with FIGS. 2 and 3 is used to drive cassette holder 24 from its load-/unload position shown in FIG. 4A to its retracted position shown in FIG. 4B. This is carried out as a safety mode operation to prevent injury to the user of camera 20 and to prevent the motor which drives holder 24 from being overloaded and from burning out.

Typically, tape cassette 27 is loaded onto cassette holder 24, whereafter door 23 is closed and the motor (not shown) drives the cassette holder to its retracted position. A switch may be actuated when door 23 is closed to change over the mode signal shown in FIG. 2 to a logic low signal, thereby enabling comparator 13 and timer 16, as described above.

If, while cassette holder 24 is driven to its retracted position, the operator inadvertently places his finger in the path of travel of the cassette holder, such as shown in FIG. 4B, plate 25 will pinch the user's finger. This obstruction will prevent holder 24 from reaching its retracted position and the current supplied to motor 2 will increase to its overload level. If the user does not take corrective action for a predetermined time, such as on the order of 1-2 seconds; for example, if he does not remove his finger or if he does not attempt to eject the tape cassette, timer 16 times out to trigger control signal generator 19. The control signal generator then supplies command signals to control logic circuit 6 which, in one embodiment, deenergizes the FET's, transistors or other variable impedance switches included in power control circuit 8, whereupon motor 2 stops. In an alternative embodiment, the command signals supplied to the control logic circuit from control signal generator 19 reverse the pair of switches which had been energized theretofore, thereby reversing the direction of current flow through motor 2 and reversing the motor. In this alternative embodiment, cassette holder 24 now is driven automatically to return to its load/unload position.

In addition to the foregoing command signals produced by control signal generator 19 in response to the output signals produced by comparator 13 and timer 16, the comparator output also is used to increase the impedance of the variable impedance switches so as to reduce the level of motor current $I_M$. This immediate reduction in motor current removes the overload condition and reduces the force that may be exerted on the user's finger by the motor-driven cassette holder.

While the present invention has been particularly shown and described with reference to preferred embodiments, it will be readily apparent to those of ordinary skill in the art that various changes and modifications may be made without departing from the spirit and scope of the invention. For example, controller 5 may be implemented by a simple microprocessor, such as the microprocessor that normally is included in the equipment with which the present invention is used, such as in video camera 20. Also, although an H-configuration of variable impedance switches has been discussed for supplying drive current to motor 2, it is recognized that other configurations may be used, such as a simple power amplifier connected in series with the motor. Furthermore, the present invention is not limited solely to the FET's or bipolar transistors which have been discussed above. Alternative switches typically used to supply drive current to a motor may be used.

It is, therefore, intended that the appended claims be interpreted as including the embodiments described herein, the alternatives mentioned above and all equivalents thereto.

What is claimed is:

1. Video cassette loading apparatus, comprising: a cassette holder movable between a cassette receiving position and a retracted position; controllable loading means for driving said cassette holder between said positions; detecting means for detecting abnormal operation of said loading means caused by an overload; and protection means coupled to said loading means for controlling the operation of said loading means to alleviate said overload by reducing a driving force exerted on said cassette holder without removing said driving force and, if the reduction in the driving force on said cassette holder fails to alleviate said overload, to selectively stop driving of said cassette holder or reverse the direction of said driving of the cassette holder.

2. The apparatus of claim 1 wherein said loading means comprises an electric motor; said detecting means comprises current sensing means for sensing motor current whose level is indicative of said overload; and said protection means comprises current control means for controlling current in said motor.

3. The apparatus of claim 2 wherein said loading means further comprises a power source, and variable impedance switch means selectively energized for coupling said motor to said power source; and said current control means comprises bias means for varying the impedance of said switch means to limit current supplied therethrough to said motor.

4. The apparatus of claim 3 wherein said variable impedance switch means comprises plural transistor means connected in H-configuration to couple said motor to said power source and selectively energized to supply current to said motor in first or second directions.

5. Video cassette loading apparatus, comprising: a cassette holder movable between a cassette receiving position and a retracted position; controllable loading means for driving said cassette holder between said positions and which includes an electric motor, a power source and variable impedance switch means selectively energized for coupling said motor to said power source; detecting means for detecting abnormal operation of said loading means caused by an overload and which comprises current sensing means for sensing motor current whose level is indicative of said overlaod including current level generating means for generating a current level signal representative of motor current, reference means for providing a reference signal representative of a reference motor current, and comparator means for comparing said current level signal to said reference signal to produce an output signal if said current level signal exceeds said reference signal; and protection means coupled to said loading means for controlling the operating of said loading means to alleviate said overload by reducing a driving force exerted on said cassette holder without removing said driving force and, if the reduction in the driving force on said cassette holder fails to alleviate said overload, to selectively stop driving of said cassette holder or reverse the direction of said driving of the cassette holder, said protection means including current control means having bias means for varying the impedance of said switch means to limit current supplied therethrough to said motor, said output signal from said comparator means being supplied to said bias means to vary the impedance of said switch means.

6. The apparatus of claim 5 wherein said current control means further comprises timer means for producing a time-out signal if said comparator means produces said output signal for a predetermined time duration, and control signal generating means coupled to said timer means for generating control signals in response to said time-out signal for determining the current supplied through said switch means to said motor.

* * * * *